United States Patent
Sahu et al.

(10) Patent No.: US 12,504,402 B2
(45) Date of Patent: Dec. 23, 2025

(54) METHOD AND SYSTEM FOR AN ACOUSTIC BASED ANOMALY DETECTION IN INDUSTRIAL MACHINES

(71) Applicant: Tata Consultancy Services Limited, Mumbai (IN)

(72) Inventors: Saurabh Sahu, Bangalore (IN); Mariswamy Girish Chandra, Bangalore (IN); Kriti Kumar, Bangalore (IN); Achanna Anil Kumar, Bangalore (IN); Angshul Majumdar, New Delhi (IN)

(73) Assignee: Tata Consultancy Services Limited, Mumbai (IN)

( * ) Notice: Subject to any disclaimer, the term of this patent is extended or adjusted under 35 U.S.C. 154(b) by 361 days.

(21) Appl. No.: 18/372,300

(22) Filed: Sep. 25, 2023

(65) Prior Publication Data

US 2024/0151690 A1    May 9, 2024

(30) Foreign Application Priority Data

Nov. 3, 2022   (IN) .............................. 202221062963

(51) Int. Cl.
    *G01N 29/04*     (2006.01)
    *G01N 29/06*     (2006.01)
    (Continued)

(52) U.S. Cl.
CPC ......... *G01N 29/043* (2013.01); *G01N 29/069* (2013.01); *G01N 29/14* (2013.01); *G01N 29/4418* (2013.01); *G01N 2291/0258* (2013.01)

(58) Field of Classification Search
CPC .... G01N 29/043; G01N 29/069; G01N 29/14; G01N 29/4418; G01N 29/262;
(Continued)

(56) References Cited

U.S. PATENT DOCUMENTS 10,735,887 B1 *   8/2020   McElveen .............. H04R 1/406
11,933,695 B2 *   3/2024   Lavid Ben Lulu .... G06N 20/00
(Continued)

OTHER PUBLICATIONS

Acoustic-Base et al. machine Anomaly Detection Using Beamforming and Sequential Transform Learning Saurabh Sahu et al., IEEE vol. 7, No. 2, Feb. 2023. (Year: 2023).*

(Continued)

*Primary Examiner* — Jacques M Saint Surin
(74) *Attorney, Agent, or Firm* — Finnegan, Henderson, Farabow, Garrett & Dunner, LLP

(57) ABSTRACT

In industrial inspection scenarios, early detection of machine malfunction is extremely essential as it helps in preventing any significant damage and the associated economic losses. Embodiments herein provide a method and system for an acoustic based anomaly detection in industrial machines using a beamforming and a sequential transform learning. Herein, the system employs two-stage multi-channel source separation technique that uses the well-known delay and sum beamforming followed by a recent data-driven sequential transform learning (STL) approach to obtain clean sources. The STL is a solution to linear state-space model where operators/matrices are learnt from data and is used here to model the dynamics of time-varying source signals for source separation. Subsequently, a reference template matching is employed on each separated source to detect an anomaly. The numerical results obtained with the Malfunctioning Industrial Machine Investigation and Inspection (MIMII) dataset demonstrate superior performance for source separation and anomaly detection.

15 Claims, 4 Drawing Sheets

(51) Int. Cl.
*G01N 29/14* (2006.01)
*G01N 29/44* (2006.01)

(58) Field of Classification Search
CPC ......... G01N 29/4481; G01N 2291/106; G01N 2291/0258; G05B 23/0221; G05B 23/024; G01L 2021/02166; G10L 25/30
USPC .......................................................... 73/596
See application file for complete search history.

(56) References Cited

U.S. PATENT DOCUMENTS 11,934,183 B2 * 3/2024 Rathore ............. G05B 19/4183
2024/0288340 A1 * 8/2024 Sahu ..................... G01H 3/125

OTHER PUBLICATIONS

Bagchi et al., "Combining Spectral Feature Mapping and Multi-Channel Model-Based Source Separation for Noise-Robust Automatic Speech Recognition," (2015).
Chen et al., "A multichannel learning-based approach for sound source separation in reverberant environments," EURASIP Journal on Audio, Speech, and Music Processing (2021).
Wang et al., "Localization Based Sequential Grouping for Continuous Speech Separation," (2022).

* cited by examiner

METHOD AND SYSTEM FOR AN ACOUSTIC BASED ANOMALY DETECTION IN INDUSTRIAL MACHINES

CROSS-REFERENCE TO RELATED APPLICATIONS AND PRIORITY

This U.S. patent application claims priority under 35 U.S.C. § 119 to Indian Application number 202221062963, filed on Nov. 3, 2022. The entire contents of the aforementioned application are incorporated herein by reference.

TECHNICAL FIELD

The disclosure herein generally relates to a field of multi-sensor fusion, more particularly, to a method and system for an acoustic based anomaly detection in industrial machines using a beamforming and a sequential transform learning.

BACKGROUND

In industrial inspection scenarios, early detection of machine malfunction is extremely essential as it helps in preventing any significant damage and the associated economic losses. It is well known that acoustic signals are primary indicators of machine health, and hence studying acoustic signals is extremely necessary. Another advantage with acoustic sensing is that it can unobtrusively be acquired using microphones. However, in a typical industrial plant, multiple machines operate simultaneously and thus, the captured acoustic source is corrupted by interference and huge background noise. Hence, there is a need to reduce this interference and background noise to separate the source of interest for improved anomaly detection.

In practical application scenarios, information about all possible anomalous machine audio is seldom available during training time. Recent studies proposed an Autoencoder (AE) based architecture, where the model is trained with normal audio of the machines and anomaly score is calculated based on a reconstruction error. All these techniques make use of the publicly available Malfunctioning Industrial Machine Investigation and Inspection (MIMII) data, where only one machine source is dominant at a time. However, they do not handle composite mixtures where all the machine sources are present simultaneously, which is the usual case in real-world factory environments. Recently, a neural network based multi-object acoustic anomaly detection method called Information-Abstraction-Net (IA-Net) was proposed, where composite mixtures are synthesized using MIMII data. This work however, utilized a single channel mixture that is difficult to scale to a complex multi-source scenario.

SUMMARY

Embodiments of the disclosure present technological improvements as solutions to one or more of the above-mentioned technical problems recognized by the inventors in conventional systems. For example, in one embodiment, a method and system for an acoustic based anomaly detection in industrial machines using a beamforming and a sequential transform learning is provided.

In one aspect, a processor-implemented method for an acoustic based anomaly detection in industrial machines using a beamforming and a sequential transform learning. The processor-implemented method comprising receiving a mixed audio signal of one or more spatially distributed audio sources via a microphone array. Further, the processor-implemented method comprising beamforming, via one or more hardware processors, the received mixed audio signal using a delay-and-sum beamforming technique to obtain a constructive superposition of the audio signal along a predefined direction and estimating, via the one or more hardware processors, at least one clean audio source of the one or more spatially distributed audio sources using a pre-trained sequential transform learning (STL). Furthermore, the processor-implemented method comprising determining, via the one or more hardware processors, a change in the estimated at least one clean audio source obtained using STL and beamforming by comparing with a template of a normal audio source of the same machine. Finally, the processor-implemented method comprising detecting, via the one or more hardware processors, one or more abnormalities in the industrial machines based on the change determined in the associated dean audio source that is below a predefined threshold in terms of signal to noise ratio (SNR).

In another aspect, a system for an acoustic based anomaly detection in industrial machines using a beamforming and a sequential transform learning is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a mixed audio signal of one or more spatially distributed audio sources using a microphone array. Further, the one or more hardware processors are configured by the programmed instructions to beamform the received mixed audio signal using a delay-and-sum beamforming technique to obtain a constructive superposition of the audio signal along a predefined direction and determine at least one clean audio source of the one or more spatially distributed audio sources using a pre-trained sequential transform learning (STL). Furthermore, the one or more hardware processors are configured by the programmed instructions to determine the change in the estimated at least one clean audio source obtained using STL and beamforming by comparing with a template of a normal audio source of the same machine. Finally, the one or more hardware processors are configured by the programmed instructions to detect one or more abnormalities in the industrial machines based on the change determined in the associated clean audio source that is below a predefined threshold in terms of signal to noise ratio (SNR).

In yet another aspect, one or more non-transitory machine-readable information storage mediums comprising one or more instructions which when executed by one or more hardware processors cause a method for an acoustic based anomaly detection in industrial machines using a beamforming and a sequential transform learning. The processor-implemented method comprising receiving a mixed audio signal of one or more spatially distributed audio sources via a microphone array. Further, the processor-implemented method comprising beamforming, via one or more hardware processors, the received mixed audio signal using a delay-and-sum beamforming technique to obtain a constructive superposition of the audio signal along a predefined direction and estimating, via the one or more hardware processors, at least one clean audio source of the one or more spatially distributed audio sources using a pre-trained sequential transform learning (STL). Furthermore, the processor-implemented method comprising determining, via the one or more hardware processors, a change in the estimated at least one clean audio source obtained using STL and beamforming by comparing with a template of a normal audio source of the same machine. Finally, the processor-implemented method comprising detecting, via the one or more hardware processors, one or more abnormalities in the industrial machines based on the change determined in the associated clean audio source that is below a predefined threshold in terms of signal to noise ratio (SNR).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
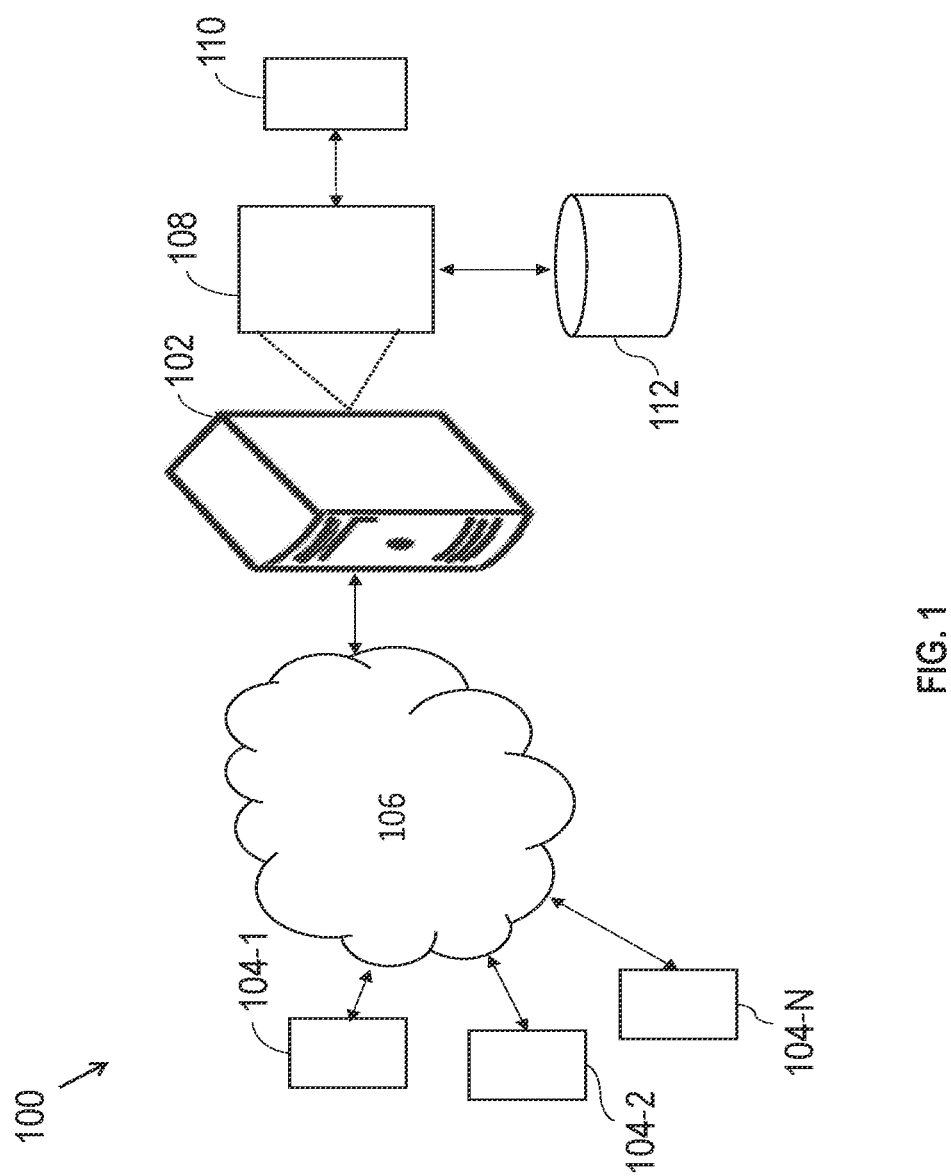
FIG. 1 illustrates a network diagram of a system for an acoustic based anomaly detection in industrial machines using a beamforming and a sequential transform learning, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

It is well known that acoustic signals are primary indicators of machine health, and hence studying acoustic signals is extremely necessary. Another advantage with acoustic sensing is that it can unobtrusively be acquired using microphones. However, in a typical industrial plant, multiple machines operate simultaneously and thus, the captured acoustic source is corrupted by interference and huge background noise. Hence, there is a need to reduce this interference and background noise to separate the source of interest for improved anomaly detection.

Therefore, embodiments herein provide a method and system for an acoustic based anomaly detection in industrial machines using a beamforming and a sequential transform learning. Herein, the system employs two-stage multi-channel source separation technique that uses the well-known delay and sum beamforming followed by a recent data-driven sequential transform learning (STL) approach to obtain clean sources.

The STL is a solution to the linear state-space model where the operators/matrices are learnt from the data and is used here to model the dynamics of the time-varying source signals for source separation. Subsequently, a reference template matching is employed on each separated source to detect an anomaly. The numerical results obtained with the Malfunctioning Industrial Machine Investigation and Inspection (MIMII) dataset demonstrate the superior performance of the proposed two stage method compared to the state-of-the-art methods for source separation and anomaly detection.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

Referring FIG. 1, illustrating a network diagram of a system 100 for an acoustic based anomaly detection in industrial machines using a beamforming and a sequential transform learning, in accordance with some embodiments of the present disclosure. Herein, the system 100 employs two-stage multi-channel source separation technique that uses the well-known delay and sum beamforming followed by the recent data-driven sequential transform learning (STL) approach to obtain clean sources.

Although the present disclosure is explained considering that the system 100 is implemented on a server, it may be understood that the system 100 may comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation, and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network (106) may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. Further, the system 100 comprises at least one memory 110 with a plurality of instructions, one or more databases 112, and one or more hardware processors 108 which are communicatively coupled with the at least one memory 110 to execute a plurality of instructions therein. The components and functionalities of the system 100 are described further in detail.

Figure 2:
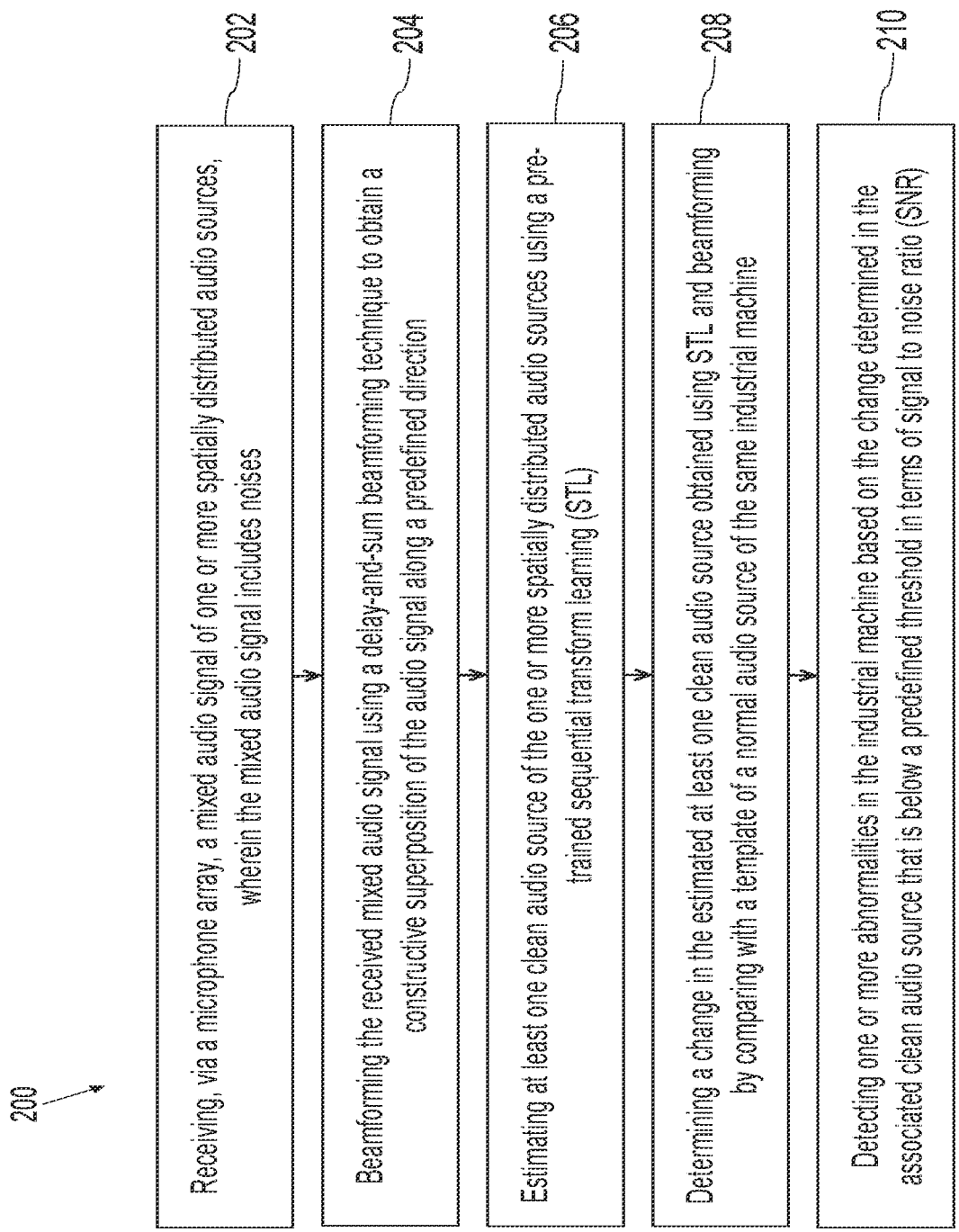
FIG. 2 is an exemplary flow diagram illustrating a processor-implemented method for an acoustic based anomaly detection in industrial machines using a beamforming and a sequential transform learning, in accordance with some embodiments of the present disclosure.

FIG. 2 is an exemplary flow diagram illustrating a processor-implemented method 200 for an acoustic based anomaly detection of industrial machines using a beamforming and a sequential transform learning implemented by the system of FIG. 1, according to some embodiments of the present disclosure.

Initially at step 202 of the method 200, a mixed audio signal of one or more spatially distributed audio sources is received via an input/output interface 104. Herein, the mixed audio signal includes noises. The mixed audio signal received by each microphone corresponding to different delays. The delay depends upon the spatial location of the audio source.

Assuming N different spatially distributed audio sources (machines) $s_1, \ldots, s_N$ that are simultaneously present in the composite mixture captured by a M-element microphone array. The received mixed signal at $m^{th}$ microphone can be mathematically expressed as:

$$y_m(t) = \sum_{n=1}^{N} a_{mn} s_n(t-\tau_{mn}) + n_m(t) \quad (1)$$

wherein, $a_{mn}$ is the attenuation coefficient and $\tau_{mn}$ denotes the arrival lag of source n at microphone m with respect to a common reference microphone and $n_m(t)$ is the additive zero mean Gaussian noise at time t and $1 \le m \le M$. The problem here is to detect the anomaly, if any, for the N sources, $s_1(t), s_2(t), \ldots, s_N(t)$ from the given M microphone signals $y_1(t), y_2(t), \ldots, y_M(t)$, assuming M>N. It is to be noted that herein an assumption is made that the number of sources N, and their spatial direction and hence the corresponding delay $\tau_{mn}$ are known.

At the next step 204 of the method 200, the one or more hardware processors 102 are configured by the programmed instructions to beamform the received mixed audio signal using a delay-and-sum beamforming technique to obtain a constructive superposition of the audio signal along a pre-defined direction.

Figure 3:
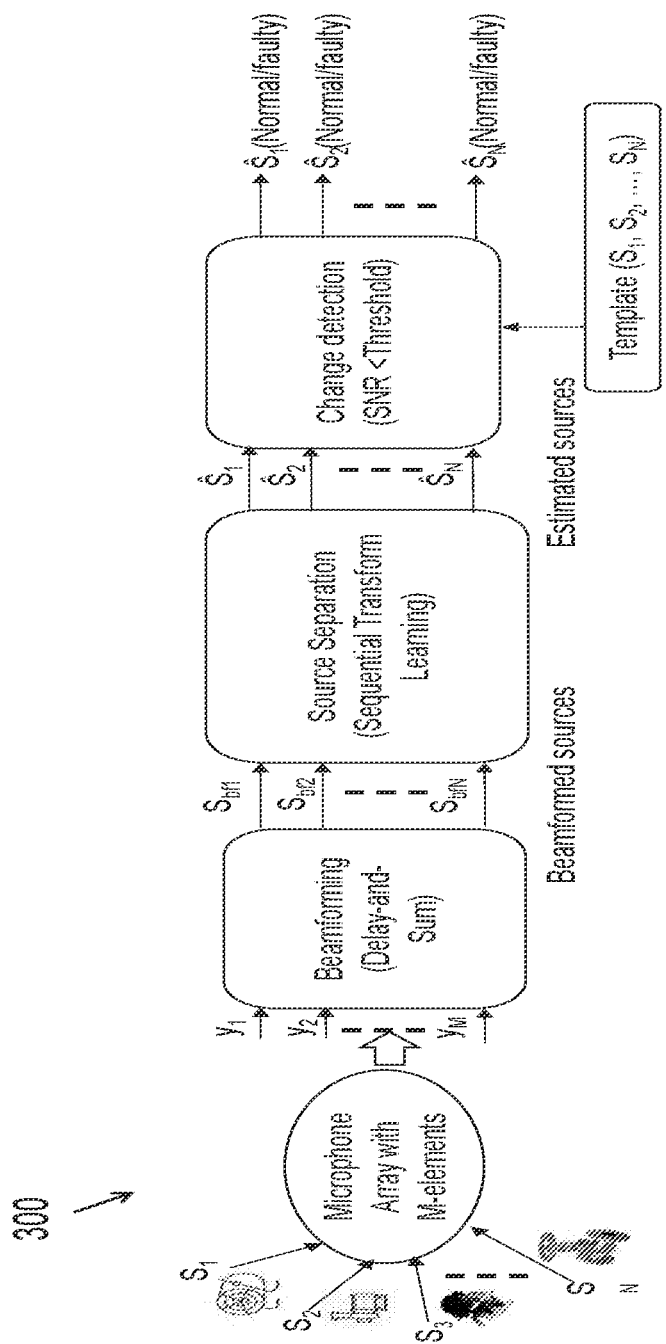
FIG. 3 is a block diagram to illustrate the multi-channel audio source separation that is employed for machine anomaly detection, in accordance with some embodiments of the present disclosure.

Referring FIG. 3, illustrating a block diagram for the multichannel audio source separation that is employed for machine anomaly detection, in accordance with some embodiments of the present disclosure. The audio signals captured by the microphone array are fed to the well-known Delay-and-Sum beamforming (DAS-BF) in the first stage. The beamformed source signals ($s_{bf1}, \ldots, s_{bfN}$) are then further fed to STL in the second stage for improved source estimation ($\hat{s}_1, \ldots, \hat{s}_N$). The estimated sources are then analysed for change detection for identifying anomalies.

Delay-and-Sum Beamforming (DAS-BF): It is noticed from equation (1) that audio signals are received by each microphone corresponding to different delays. These delays essentially depend upon their spatial location and as mentioned earlier, the delays are assumed to be known. Depending on the direction of the desired source, say $s_n$, the traditional DAS-BF adds the time-shifted delayed signals as:

$$s_{bf_n}(t) = \sum_{m=1}^{M} y_m(t-\tau_{mn}) \quad (2)$$

wherein, the operation results in a constructive superposition of signal only along the desired direction and hence enhances the desired source compared to the other source signals. This process is followed for all the N sources and the beamformed signals $s_{bf1}, \ldots, s_{bfN}$ are estimated. These beamformed signals are fed to the STL for improved separation.

At the next step 206 of the method 200, the one or more hardware processors 102 are configured by the programmed instructions to estimate at least one clean audio source of the one or more spatially distributed audio sources using a pre-trained sequential transform learning (STL).

At the next step 208 of the method 200, the one or more hardware processors 102 are configured by the programmed instructions to determine a change in the estimated at least one clean audio source obtained using STL and beamforming by comparing with a template of a normal audio source of the same machine.

Figure 4:
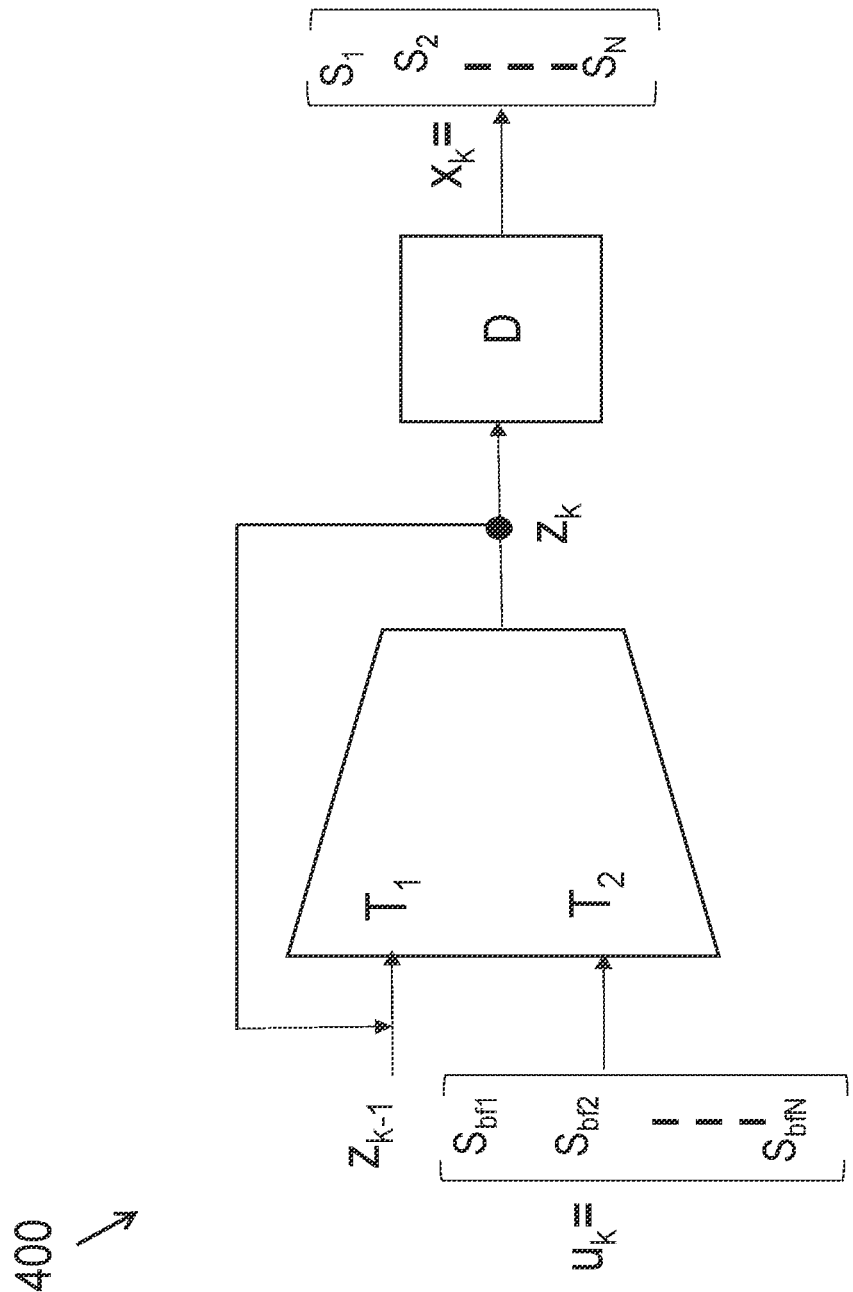
FIG. 4 is a block diagram to illustrate a data-driven sequential transform learning (STL), in accordance with some embodiments of the present disclosure.

Referring FIG. 4, illustrating a block diagram for STL, in accordance with some embodiments of the present disclosure. The STL is a data-driven state-space modelling technique that is utilized here for the second stage source separation. The STL starts with the basic linear state-space model where at each time step $k \in \{1, \ldots, K\}$, the representation $z_k \in R^{N_z}$ with $N_z$ hidden state dimensions and the output $x_k \in R^{N_x}$ with $N_x$ dimensions, are given as:

$$z_k = T_1 z_{k-1} + T_2 u_k + v_{1,k}$$

$$x_k = D z_k + v_{2,k} \quad (3)$$

wherein, $u_k \in R^{N_u}$ denote the input vector with $N_u$ features, $D \in R^{N_x \times N_z}$ denote the observation matrix and $T_1 \in R^{N_z \times N_z}$, $T_2 \in R^{N_z \times N_u}$ represent the transforms. In this STL model, the process noise $v_{1,k}$ and the observation noise $v_{2,k}$ are assumed to be zero-mean Gaussian random variables with covariance matrices Q and R, respectively.

While in the classical state-space model, the matrices are known, STL learns these from the data during the training phase. In this way, STL keeps the best of both worlds—the interpretability of signal processing with the function approximation capability of neural networks. In the context of source separation, $u_k$ are the N beamformed source signals ($s_{bf1}, \ldots, s_{bfN}$), $x_k$ are the corresponding separated refined source signals ($s_1, \ldots, s_N$) and $z_k$ is the state-space vector. This method has a training phase, where the representation $z_k$ and unknown matrices ($T_1, T_2, D$) are estimated in an alternating manner using the Expectation-Maximization (EM) approach utilizing the knowledge of the true source signals $x_k$. Here, the training is carried out on the mixture comprising of only normal machine audio from each of the machines. During the test phase, the test beamformed source signals ($u_k$) are fed to the model learnt in terms of $T_1, T_2$ and D for estimating the different sources ($x_k$) using equation 3.

Finally, at the last step 210 of the method 200, the one or more hardware processors 102 are configured by the programmed instructions to detect one or more abnormalities in the industrial machine based on the change detection and a predefined threshold. The machine anomaly is detected whenever the change determined in the corresponding clean audio source falls below the predefined threshold (defined in terms of SNR); empirically calculated for each machine.

Experiments:

The potential of the proposed two-stage approach for robust anomaly detection is evaluated using MIMII dataset. It is a publicly available dataset that contains both normal and anomalous acoustic signals from four different machines namely, solenoid valves, water pumps, industrial fans, and slide rails, operating in a real factory environment. The experimental setup employs a circular microphone array of eight elements (channels) sampled at 16 kHz with the different machines spatially placed at 0, 90, 180, 270 degrees. This dataset contains multiple audio files (10s each) for every machine with factory noise added at different signal-to noise ratio (SNR) levels. Although the data contains seven different product models for each machine, one product model (model ID: 00) is considered for each machine type with 6 dB SNR for performance evaluation. Model ID: 00 contains a total of 4076 normal and 1025 anomalous audio files. In the proposed method and system, the audio from all the industrial machines is added together channel-wise to mimic the real factory environment. This composite mixture is utilized for source separation followed by template matching based anomaly detection.

The STL approach utilizes the EM technique to obtain closed-form updates for the representation, transform, and observation matrices. Using beamforming in the first stage enhances the desired signal making it easier for the Source Separation (SS) technique to estimate the sources. The proposed method provides significant improvement in the Signal-to-Noise Ratio (SNR) compared to other state-of-the-art signal processing and deep learning techniques for separating audio from normal mixtures using the MIMII data (Table 1). The results are provided for two configurations: (i) Single-stage SS: SS techniques employed directly on the multi-channel data, and (ii) Two-stage SS: DAS-BF in the first stage followed by SS techniques in the next stage. Here, 50% of synthesized normal mixture files are used for training while the remaining 50% files are used for testing. Table 1 summarizes the source separation results obtained with different techniques. When the mixture contains faulty machine audio, a simple template matching approach applied on the separated sources is able to detect machine faults effectively compared to other benchmark methods (Table 2). Table 2 shows the anomaly detection performance with various techniques in terms of accuracy and F1 score. The results show that the proposed method is more robust and is able to detect anomalies with less false positives.

TABLE 1

| | Sources | | | | | | | |
|---|---|---|---|---|---|---|---|---|
| | Single-Stage SS | | | | Two-Stage SS | | | |
| Methods | Fan | Pump | Slider | Valve | Fan | Pump | Slider | Valve |
| DAS-BF | 1.72 | −5.51 | 2.20 | −8.91 | — | — | — | — |
| FAST MNMF | 1.95 | 0.97 | 0.66 | 2.03 | 3.06 | 0.59 | 1.83 | −2.10 |
| Randdir | −0.61 | −1.67 | 0.14 | 0.39 | 0.37 | −0.77 | 0.60 | 1.72 |
| MVAE | 1.72 | 0.81 | 1.62 | 0.32 | 3.03 | −1.30 | 2.48 | −4.62 |
| STL (Proposed) | 2.01 | 0.90 | −0.55 | −3.07 | 4.49 | 1.64 | 2.90 | 2.29 |

TABLE 2

| | Fan | | Pump | | Slider | | Valve | |
|---|---|---|---|---|---|---|---|---|
| Methods | Acc. | F1 | Acc. | F1 | Acc. | F1 | Acc. | F1 |
| MVAE | 0.55 | 0.47 | 0.71 | 0.52 | 0.54 | 0.43 | 0.79 | 0.37 |
| FASTMNMF | 0.47 | 0.28 | 0.60 | 0.31 | 0.53 | 0.27 | 0.18 | 0.02 |
| Randdir | 0.55 | 0.29 | 0.58 | 0.21 | 0.57 | 0.27 | 0.70 | 0.42 |
| DAS-BF | 0.44 | 0.23 | 0.25 | 0.05 | 0.25 | 0.04 | 0.50 | 0.11 |
| IA-Net | 0.65 | 0.50 | 0.77 | 0.55 | 0.80 | 0.62 | 0.81 | 0.43 |
| STL (Proposed) | 0.96 | 0.90 | 0.99 | 0.98 | 0.94 | 0.91 | 0.93 | 0.82 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem associated with acoustic based anomaly detection for industrial machines. Herein, embodiments herein provide a method and system for an acoustic based anomaly detection of industrial machines using a beamforming and a sequential transform learning. Herein, the system employs two-stage multi-channel source separation technique that uses the well-known delay and sum beamforming followed by a recent data-driven sequential transform learning (STL) approach to obtain clean sources. The clean sources obtained are further analyzed for machine anomaly detection.

It is to be understood that the scope of the protection is extended to such a program and in addition to a computer-readable means having a message therein: such computer-readable storage means contain program-code means for implementation of one or more steps of the method, when the program runs on a server or mobile device or any suitable programmable device. The hardware device can be any kind of device, which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purpose of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for an acoustic based anomaly detection in an industrial machine comprising:
    receiving, via a microphone array, a mixed audio signal of one or more spatially distributed audio sources, wherein the mixed audio signal includes noises;
    beamforming, via one or more hardware processors, the received mixed audio signal using a delay-and-sum beamforming technique to obtain a constructive superposition of the audio signal along a predefined direction;
    estimating, via the one or more hardware processors, at least one clean audio source of the one or more spatially distributed audio sources using a pre-trained sequential transform learning (STL), wherein the STL is used to model dynamics of the time-varying source signals for source separation;
    determining, via the one or more hardware processors, a change in the estimated at least one clean audio source of the one or more spatially distributed audio sources obtained using STL and beamforming by comparing with a template of a normal audio source of the same industrial machine; and
    detecting, via the one or more hardware processors, one or more abnormalities in the industrial machine based on the change determined in the associated clean audio source that is below a predefined threshold in terms of signal to noise ratio (SNR).

2. The processor-implemented method of claim 1, wherein the sequential transform learning (STL) model is trained on a mixture of normal audio of each of the one or more spatially distributed audio sources.

3. The processor-implemented method of claim 1, wherein the mixed audio signal received by each microphone of the microphone array is associated with different delays.

4. The processor-implemented method of claim 1, wherein the delay depends upon the spatial location of the audio source.

5. The processor-implemented method of claim 1, wherein the predefined threshold in terms of signal to noise ratio (SNR) is empirically calculated for each machine.

6. A system for an acoustic based anomaly detection in an industrial machine comprising:
    an input/output interface;
    one or more hardware processors;
    a memory in communication with the one or more hardware processors, wherein the one or more hardware processors are configured to execute programmed instructions stored in the memory, to:
        receive a mixed audio signal of one or more spatially distributed audio sources via a microphone array, wherein the mixed audio signal includes noises;
        beamform the received mixed audio signal using a delay-and-sum beamforming technique to obtain a constructive superposition of the audio signal along a predefined direction;
        estimate at least one clean audio source of the one or more spatially distributed audio sources using a pretrained sequential transform learning (STL), wherein the STL is used to model dynamics of the time-varying source signals for source separation;
        determine a change in the estimated at least one clean audio source of the one or more spatially distributed audio sources obtained using STL and beamforming by comparing with a template of a normal audio source of the same industrial machine; and
        detect one or more abnormalities in the industrial machines based on the change determined in the associated clean audio source that is below a predefined threshold in terms of signal to noise ratio (SNR).

7. The system of claim 6, wherein the sequential transform learning (STL) model is trained on a mixture of normal audio of each of the one or more spatially distributed audio sources.

8. The system of claim 6, wherein the mixed audio signal received by each microphone of the microphone array is associated with different delays.

9. The system of claim 6, wherein the delay depends upon the spatial location of the audio source.

10. The system of claim 6, wherein the predefined threshold in terms of signal to noise ratio (SNR) is empirically calculated for each machine.

11. One or more non-transitory machine-readable information storage mediums comprising one or more instructions which when executed by one or more hardware processors cause an acoustic based anomaly detection in an industrial machine comprising:
    receiving, via a microphone array, a mixed audio signal of one or more spatially distributed audio sources, wherein the mixed audio signal includes noises;
    beamforming the received mixed audio signal using a delay-and-sum beamforming technique to obtain a constructive superposition of the audio signal along a predefined direction;
    estimating at least one clean audio source of the one or more spatially distributed audio sources using a pre-trained sequential transform learning (STL), wherein the STL is used to model dynamics of the time-varying source signals for source separation;
    determining a change in the estimated at least one clean audio source of the one or more spatially distributed audio sources obtained using STL and beamforming by comparing with a template of a normal audio source of the same industrial machine; and detecting one or more abnormalities in the industrial machine based on the change determined in the associated clean audio source that is below a predefined threshold in terms of signal to noise ratio (SNR).

12. The one or more non-transitory machine-readable information storage mediums of claim 11, wherein the sequential transform learning (STL) model is trained on a mixture of normal audio of each of the one or more spatially distributed audio sources.

13. The one or more non-transitory machine-readable information storage mediums of claim 11, wherein the mixed audio signal received by each microphone of the microphone array is associated with different delays.

14. The one or more non-transitory machine-readable information storage mediums of claim 11, wherein the delay depends upon the spatial location of the audio source.

15. The one or more non-transitory machine-readable information storage mediums of claim 11, wherein the predefined threshold in terms of signal to noise ratio (SNR) is empirically calculated for each machine.

* * * * *